(12) United States Patent
Lei et al.

(10) Patent No.: US 8,887,251 B2
(45) Date of Patent: Nov. 11, 2014

(54) HANDOVER METHOD OF MOBILE TERMINAL BETWEEN HETEROGENEOUS NETWORKS

(75) Inventors: Peng Lei, Suwon-si (KR); Jeong Jae Won, Hwaseong-si (KR); Young Seok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 13/142,707

(22) PCT Filed: Dec. 23, 2009

(86) PCT No.: PCT/KR2009/007706
§ 371 (c)(1),
(2), (4) Date: Sep. 23, 2011

(87) PCT Pub. No.: WO2010/077007
PCT Pub. Date: Jul. 8, 2010

(65) Prior Publication Data
US 2012/0005731 A1 Jan. 5, 2012

(30) Foreign Application Priority Data
Dec. 29, 2008 (KR) .................. 10-2008-0135305

(51) Int. Cl.
*H04L 29/06* (2006.01)
*H04W 12/06* (2009.01)
*H04W 36/14* (2009.01)
*H04W 36/18* (2009.01)
*H04W 84/12* (2009.01)
*H04W 88/08* (2009.01)

(52) U.S. Cl.
CPC ............ *H04W 12/06* (2013.01); *H04L 63/083* (2013.01); *H04W 36/14* (2013.01); *H04W 36/18* (2013.01); *H04W 84/12* (2013.01); *H04W 88/08* (2013.01)
USPC ........ 726/6; 726/7; 726/8; 713/153; 713/155; 713/168; 713/171; 380/247; 380/248; 380/277; 455/411; 455/443; 455/445

(58) Field of Classification Search
CPC ..... H04L 63/062; H04L 63/06; H04L 63/065; H04L 63/067; H04L 63/08; H04L 63/0876; H04L 63/0884; H04L 63/0892; H04L 9/0819; H04L 9/3273; H04L 9/0847; H04L 2209/80; H04W 12/04; H04W 12/06
USPC ............................................................ 726/6
See application file for complete search history.

(56) References Cited

U.S. PATENT DOCUMENTS 6,879,690 B2 * 4/2005 Faccin et al. .................. 380/247
7,350,077 B2 * 3/2008 Meier et al. ................... 713/171

(Continued)

OTHER PUBLICATIONS

Shen, Sung-Shiou, et al, 'Fast Handover Pre-Authentication Protocol in 3GPP-WLAN Heterogeneous Mobile Networks', Scientific Research Publishing Inc., rev. Mar. 8, 2014, entire document, www.scirp.org/journal/PaperDownload.aspx?paperID=44815.*

(Continued)

*Primary Examiner* — Luu Pham
*Assistant Examiner* — Ronald Baum
(74) *Attorney, Agent, or Firm* — Jefferson IP Law, LLP

(57) ABSTRACT

A handover method of a mobile terminal between heterogeneous networks for facilitating the handover with pre-authentication procedure is provided. A handover method between heterogeneous networks includes receiving, at a mobile terminal connected to a source network, information on at least one target authenticator of a target network from a source authenticator in response to an attach request; creating an authentication key between the mobile terminal and the target authenticator selected among the at least one target authenticator through a pre-authentication process; determining, when the mobile terminal transmits a handover request to the selected target authenticator, whether the authentication key contained in the handover request matches with the authentication key stored in the selected target authenticator; and connecting, when the authentication keys match with each other, to the target network via the selected target authenticator.

38 Claims, 5 Drawing Sheets

(56) References Cited

U.S. PATENT DOCUMENTS

| | | | |
|---|---|---|---|
| 7,370,350 B1* | 5/2008 | Salowey | 726/7 |
| 7,676,041 B2* | 3/2010 | Horn et al. | 380/278 |
| 7,940,779 B2* | 5/2011 | Giaretta et al. | 370/400 |
| 8,036,664 B2* | 10/2011 | Khetawat et al. | 455/436 |
| 8,332,912 B2* | 12/2012 | Naslund et al. | 726/3 |
| 8,539,559 B2* | 9/2013 | Nakhjiri | 726/6 |
| 8,713,303 B2* | 4/2014 | Li et al. | 713/151 |
| 2005/0208945 A1* | 9/2005 | Hong et al. | 455/436 |
| 2006/0223526 A1* | 10/2006 | Qi et al. | 455/432.1 |
| 2007/0003062 A1* | 1/2007 | Mizikovsky et al. | 380/270 |
| 2007/0100981 A1* | 5/2007 | Adamczyk et al. | 709/223 |
| 2007/0204155 A1 | 8/2007 | Dutta et al. | |
| 2007/0213033 A1 | 9/2007 | Alper et al. | |
| 2008/0072301 A1* | 3/2008 | Chia et al. | 726/8 |
| 2008/0263631 A1* | 10/2008 | Wang et al. | 726/2 |
| 2008/0270794 A1* | 10/2008 | Falk et al. | 713/168 |
| 2008/0310366 A1 | 12/2008 | Oba et al. | |
| 2009/0046655 A1* | 2/2009 | Zhao et al. | 370/331 |
| 2009/0111428 A1* | 4/2009 | Blommaert et al. | 455/411 |
| 2010/0097977 A1* | 4/2010 | Rommer et al. | 370/315 |
| 2010/0195621 A1* | 8/2010 | Kekki et al. | 370/332 |
| 2010/0228967 A1* | 9/2010 | Hahn et al. | 713/155 |
| 2010/0296481 A1* | 11/2010 | Weniger et al. | 370/331 |
| 2011/0004754 A1* | 1/2011 | Walker et al. | 713/168 |

OTHER PUBLICATIONS

Schmitz, R., et al, '[SHAMAN project Results of Review, Requirements and Reference Architecture', Jun. 29, 2001, SHA/DOC/SAG/WP1/D02/1.1, entire document, http://www.isrc.rhul.ac.uk/shaman/docs/d02v2.pdf.*

* cited by examiner

Fig. 2

L3 Pre-authentication EAP (200)

| IP Header | UDP Header | 802.1x Version | Type | Length | EAP Payload |

L3 Pre-authentication Start (201)

| IP Header | UDP Header | Protocol discriminator | Security header type | Authentication Start message type |

L3 Pre-authentication Request (202)

| IP Header | UDP Header | Protocol discriminator | Security header type | Authentication request message type | Key set identifier | Authentication RAND | Authentication AUTN |

L3 Pre-authentication Response (203)

| IP Header | UDP Header | Protocol discriminator | Security header type | Authentication response message type | Key set identifier | Authentication response parameter |

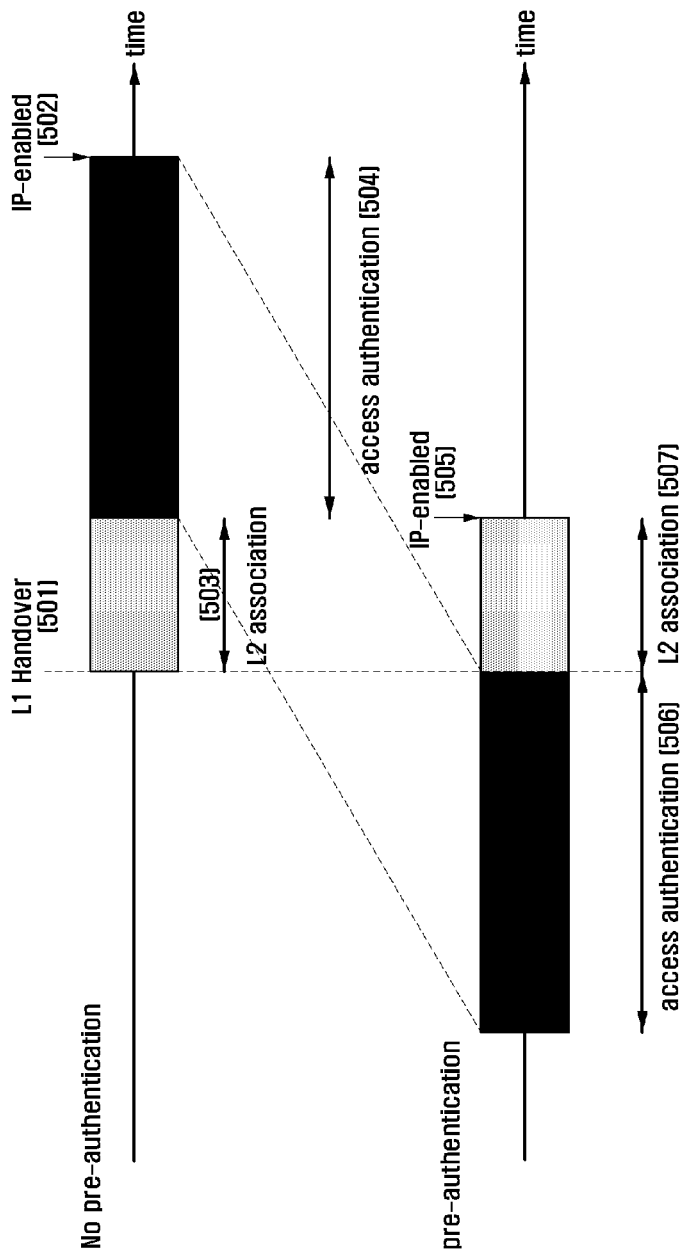

# HANDOVER METHOD OF MOBILE TERMINAL BETWEEN HETEROGENEOUS NETWORKS

TECHNICAL FIELD

The present invention relates to wireless communications and, in particular, to a handover method of a mobile terminal between heterogeneous networks that is capable of facilitating the handover with pre-authentication procedure.

BACKGROUND ART

Long Term Evolution (LTE) is an advanced $3^{rd}$ Generation mobile communication technology aiming to support a high data rate up to 300 Mbps and packet-switched traffic with seamless mobility. However, the LTE system operates in the bandwidth relatively narrow as compared to a Wireless Local Area Network (WLAN). In contrast, the WLAN system based on the Institute of Electrical and Electronics Engineers (IEEE) 802.11 standard provides high bandwidth and data rate but is lack of mobility support.

In order to exploit the advantages of the LTE and WLAN systems having different characteristics, it is indispensable to secure the seamless mobility between the two systems. The seamless mobility means keeping an uninterrupted connection at all times when moving between two networks and thus requires guaranteeing stable handover. Particularly in the handover between heterogeneous networks, a mobile terminal must perform authentication process with the handover target network, and the connection with the current network is broken after the completion of authentication process.

In case that the mobile terminal is moving fast, however, it is very limited to maintain the connection to the current network. Accordingly, the authentication delay is one of the main factors influencing the stability of the handover.

RFC 5191 defines Protocol for Carrying Authentication for Network Access (PANA) for Extensible Authentication Protocol (EAP) to enable network access authentication between users and access network. In PANA, pre-authentication is used for the handover, however, the LTE adopts an Evolved Packet System-Authentication and Key Agreement (EPS AKA) method rather than EAP authentication method, it is difficult to use the EAP-based authentication in the handover from the WLAN system to the LTE system. Although the pre-authentication method is introduced in IEEE 802.11i, it is a Layer 2 protocol and limited to the WLAN system, thereby being unadoptable for the handover between heterogeneous networks.

There is therefore a need to develop a method for supporting a pre-authentication procedure applicable to the handover between LTE and WLAN systems.

DISCLOSURE OF INVENTION

Technical Problem

In order to solve the above problems of prior arts, the present invention provides a handover method of a mobile terminal between heterogeneous networks that is capable of providing seamless mobility by minimizing authentication delay with an improved pre-authentication procedure.

Solution to Problem

In accordance with an exemplary embodiment of the present invention, a handover method between heterogeneous networks includes receiving, at a mobile terminal connected to a source network, information on at least one target authenticator of a target network from a source authenticator in response to an attach request; creating an authentication key between the mobile terminal and the target authenticator selected among the at least one target authenticator through a pre-authentication process; determining, when the mobile terminal transmits a handover request to the selected target authenticator, whether the authentication key contained in the handover request matches with the authentication key stored in the selected target authenticator; and connecting, when the authentication keys match with each other, to the target network via the selected target authenticator.

In accordance with another exemplary embodiment of the present invention, a mobile terminal including radio interfaces for heterogeneous networks, wherein the mobile terminal is characterized by receiving information on at least one target authenticator of a target network from a source authenticator in response to an attach request; creating an authentication key between the mobile terminal and the target authenticator selected among the at least one target authenticator through a pre-authentication process; determining, when the mobile terminal transmits a handover request to the selected target authenticator, whether the authentication key contained in the handover request matches with the authentication key stored in the selected target authenticator; connecting, when the authentication keys match with each other, to the target network via the selected authenticator In accordance with still another exemplary embodiment of the present invention, a communication system including heterogeneous wireless networks includes a source authenticator of a first network which sends information on target authenticator of a second network to which a handover is available in response to an attach request transmitted by a mobile terminal; a mobile terminal which receives the information on the target authenticator from the source authenticator in response to the attach request, creates an authentication key with the target authenticator through a pre-authentication process, determines, when the mobile terminal transmits a handover request to the selected target authenticator, whether the authentication key contained in the handover request matches with the authentication key stored in the selected target authenticator, and connects, when the authentication keys match with each other, to the target network via the selected authenticator; and a target authenticator which creates the authentication key through the pre-authentication process with the mobile terminal, receives the handover request transmitted by the mobile terminal, authenticates the mobile terminal by verifying whether the authentication key contained in the handover request matches with the authentication key stored in the target authenticator.

Advantageous Effects of Invention

According to an exemplary embodiment of the present invention, the handover method of a mobile terminal between heterogeneous networks is capable of performing a pre-authentication process between the mobile terminal and a target network before the handover procedure starts, resulting in reduction of handover delay and improvement of seamless mobility.

BRIEF DESCRIPTION OF DRAWINGS

The above and other objects, features and advantages of the present invention will be more apparent from the following detailed description in conjunction with the accompanying drawings, in which:

FIG. 2 is a diagram illustrating message formats for use in the pre-authentication procedure for a handover of a mobile terminal between heterogeneous networks according to an exemplary embodiment of the present invention;

FIG. 5 is a diagram illustrating the principle of how to reduce the handover delay in the handover method using the pre-authentication process according to an exemplary embodiment of the present invention.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

In the following, descriptions are made with the terms defined in the 3GPP LTE and IEEE 802.1x standards.

Figure 1:
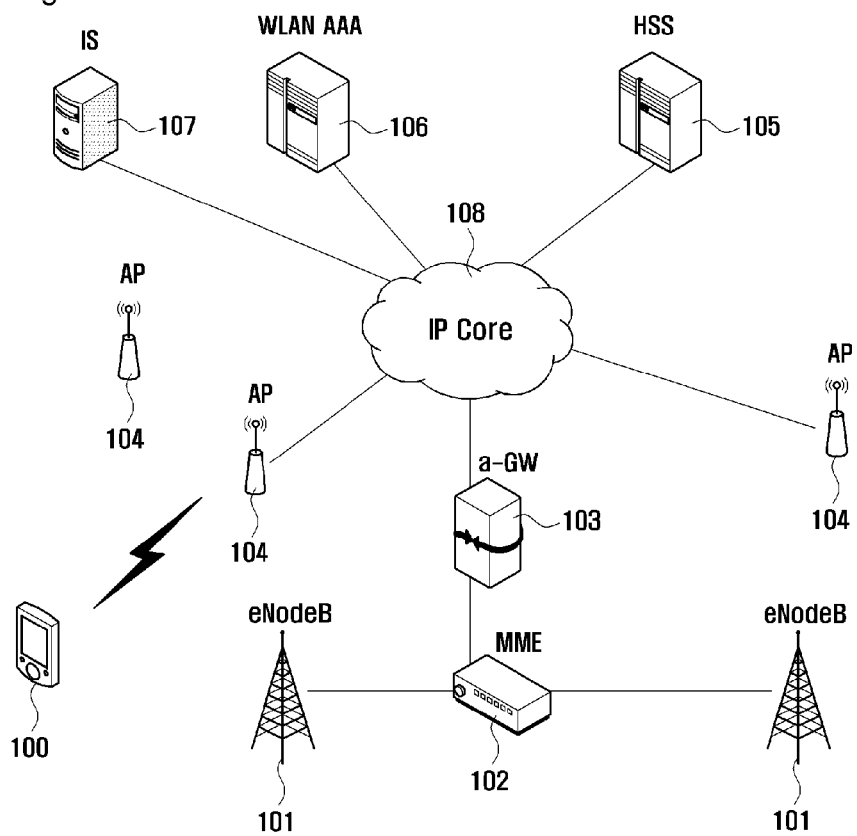
FIG. 1 is a diagram illustrating a communications system including heterogeneous networks to which a handover method according to an exemplary embodiment of the present invention is applied.

FIG. 1 is a diagram illustrating a communications system including heterogeneous networks to which a handover method according to an exemplary embodiment of the present invention is applied.

As shown in FIG. 1, the wireless communication system includes a mobile terminal 100, an Information Server 107, an LTE/SAE network, a WLAN network, and an IP ore network 108. The LTE/SAE system includes an evolved Node B (ENB) 101, a Mobility Management Entity (MME) 102, an access Gateway (a-GW) 103, and a Home Subscriber Server (HSS) 105. The WLAN network includes an Access point (AP) 104, an Authentication/Authorization/Accounting (AAA) server 106.

In the LTE/SAE network, the mobile terminal 100 can connect to the IP core network 108 via the ENB 101, MME 102, and a-GW 103. In the WLAN network, the mobile terminal 100 can connect to the IP core network 108 via the AP 104. In order for the mobile terminal 100 makes a seamless handover from a currently connected network (hereinafter called "source network") to another network (hereinafter called "target network"), it performs a pre-authentication process with an authentication entity of the target network while maintaining the connection to the source network.

The IS 107 stores the authentication entity information about the heterogeneous networks. The MME 102 is responsible for the authentication in the LTE/SAE network, and the AP 104 is responsible for the authentication in the WLAN network. The IS 107 stores the IP addresses of the MME 102 and the AP 104, and the mobile terminal 100 accesses the IS 107 to acquire the IP address of the MME 102 or the AP 104.

In an exemplary embodiment of the present invention, the pre-authentication protocol operates on the application layer and is based on the User Datagram Protocol (UDP) associated with a specific port number. The specific port number is required to be assigned by the Internet Assigned Numbers Authority (IANA). In case that the port number is not assigned yet, a temporary port number having no conflict with other UDP applications can be used.

The pre-authentication in the AP 104, as the authentication entity of the WLAN network, is performed with the IEEE 802.1x authentication message as the pre-authentication payload, and the pre-authentication in the MME 102 as the authentication entity of the LTE/SAE is performed with the EPS-AKA authentication message as the pre-authentication payload. This means that the pre-authentication process is performed with the IEEE 802.1x protocol in the WLAN network and the EPS-AKA protocol in the LTE/SAE network.

The pre-authentication result of the WLAN network is the Pairwise Master Key Security Association (PMKSA). When the IEEE 802.1x authentication is successful, the mobile terminal 100 and the AP 104 as the authentication entity of the target network generate the PMKSA. The PMKSA is stored in the PMKSA caches of the mobile terminal 100 and the AP along with a PMKID for identifying the PMKSA.

In case that the mobile terminal 100 attempts a handover from the LTE/SAE network to the WLAN network using the pre-authentication function according to an exemplary embodiment of the present invention, 4-way handshake is performed immediately using the PMKSA without need of the execution of the entire IEEE 802.11i authentication process.

The pre-authentication result of the LTE/SAE network is a $K_{ASME}SA$. When the EPS-AKA authentication is successful, the mobile terminal 100 and the MME 102 as the authentication entity of the target network generate the $K_{ASME}SA$. The $K_{ASME}SA$ is stored in the $K_{ASME}SA$ cache of the mobile terminal 100 and the MME 102 along with a $K_{ASME}ID$. The $K_{ASME}ID$ is generates as equation (1):

$$K_{ASME}ID = HMAC\text{-}SHA1\text{-}128(K_{ASME}, \text{"KASME Name"} \| IMSI)$$

where HMAC-SHA1-128 means the first 128 bits of the HMAC (Hash Message Authentication Code) SHA1 (Secure Hash Algorithm 1) function, and IMSI (International Mobile Station Identifier) is a unique identifier of the mobile terminal.

In case that the mobile terminal 100 attempts a handover from the WLAN network to the LTE/SAE network using the pre-authentication function according to an exemplary embodiment of the present invention, the mobile terminal generates $K_{NAS}$ and $K_{eNB}$ using the $K_{ASME}$ and performs the NAS SMC and AS SMC processes immediately without need of the execution of the entire EPS-AKA authentication process.

FIG. 2 is a diagram illustrating message formats for use in the pre-authentication procedure for a handover of a mobile terminal between heterogeneous networks according to an exemplary embodiment of the present invention.

In the pre-authentication procedure, the mobile terminal and the authentication entity of a handover target network exchanges pre-authentication packets. The mobile terminal 100 performs the pre-authentication procedure whenever it accesses the LTE/SAE network or the WLAN network. The mobile terminal 100 generates a Layer 3 (L3) pre-authentication message of which destination IP address is set to the IP address of the authentication entity of the target network and sends the L3 pre-authentication message to the authentication entity of the source network, and the authentication entity of the source network forwards the pre-authentication message to the authentication entity of the target network.

In case that the target network is a WLAN network, the authentication entity, i.e. the AP, of the target network receives the L3 pre-authentication-EAP message 200 and performs the IEEE 802.1x authentication. In case that the target network is an LTE/SAE network, the authentication entity, i.e. the MME, of the target network receives the L3 pre-authentication-start message 201 and performs the EPS-AKA authentication. These pre-authentication messages are delivered to the application layer via the IP layer. Once the pre-authentication procedure is triggered, the L3 pre-authentication request message and the L3 pre-authentication response message are exchanged between the mobile terminal and the authentication entity of the target network.

If the target network is the WLAN network, the mobile terminal 100 has the PMKSA generated as a result of the pre-authentication procedure with the AP of the WLAN network. Otherwise, if the target network is the LTE/SAE network, the mobile terminal 100 has the $K_{ASME}$ generated as a result of the pre-authentication procedure with the MME of the LTE/SAE network.

If the pre-authenticated mobile terminal 100 attempts to access the WLAN network, the AP 104 of the WLAN network retrieves the PMKSA identical with that of the mobile terminal 100 and performs the 4-way handshake process. If the pre-authenticated mobile terminal 100 attempts to access the LTE/SAE network, the MME 102 of the LTE/SAE network retrieves the $K_{ASME}$SA identical with that of the mobile terminal 100 and performs the NAS SMC process.

Figure 3:
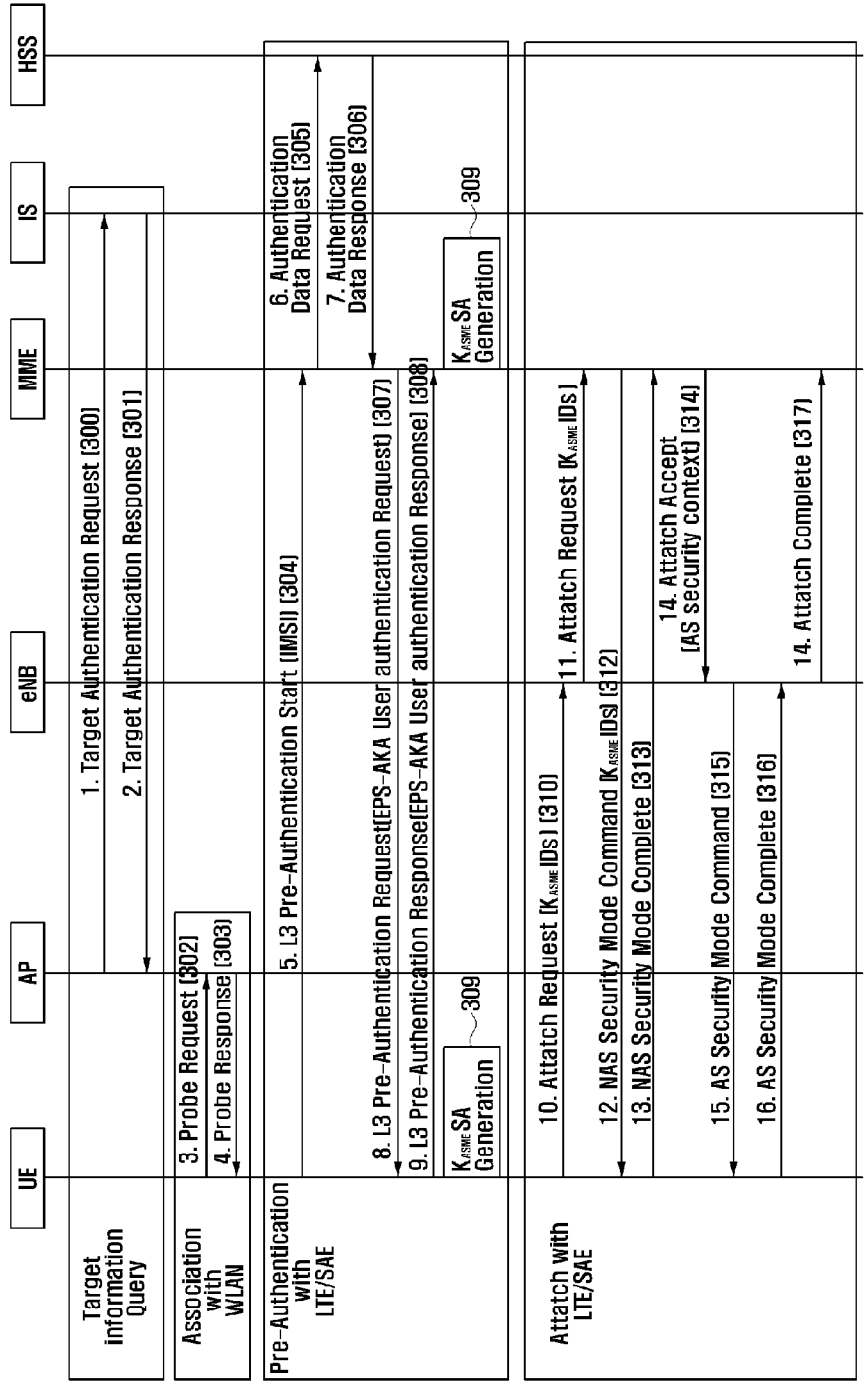
FIG. 3 is a sequence diagram illustrating operations of network entities in a handover of the mobile terminal between heterogeneous networks according to an exemplary embodiment of the present invention.

FIG. 3 is a sequence diagram illustrating operations of network entities in a handover of the mobile terminal between heterogeneous networks according to an exemplary embodiment of the present invention. In the exemplary embodiment of FIG. 3, the mobile terminal 100 attempts the handover from the WLAN network to the LTE/SAE network.

Referring to FIG. 3, the handover method from the WLAN network to the LTE/SAE network is divided into four processes. The first process is a target information query process in which the mobile terminal acquires the information on the available MMEs from the IS 107 at the system setup of the WLAN network. This process is a process for preparing the pre-authentication. The second process is a WLAN association process in which the mobile terminal 100 connects to the WLAN network. The third process is a pre-authentication process in which the mobile terminal 100 is actually performing the pre-authentication with the MME 102 of the LTE/SAE network. Finally, the fourth process is an LTE/SAE attachment process in which the mobile terminal 100 attempts the handover to attach to the LTE/SAE network. In the LTE/SAE attachment process, the $K_{ASME}$SA is used such that the entire EPS-AKA authentication step is negated. These stepwise processes for the handover are described hereinafter in more detail.

First, the AP 104 sends a Target Authentication Request message formatted for the LTE/SAE network to the IS 107 at the system setup of the WLAN network (300). Upon receipt of the Target Authentication Request message, the IS 107 sends a Target Authentication Response message containing the IP addresses of available authentication entities of potential target networks to the AP 104 (301).

Afterward, the mobile terminal 100 sends a Probe Request message to the AP to attempt the access to the WLAN network (302), and the AP 104 sends a Probe Response message to permit the access of the mobile terminal 100 in response to the Probe Request message (303). The Probe Response message contains the IP addresses of the available authentication entities of the potential target networks.

Once the Probe Response message is received, the mobile terminal 100 sends an L3 Pre-authentication Start message to the MME 102 as the authentication entity of the target LTE/SAE network to initiate the pre-authentication procedure (304). Upon receipt of the L3 Pre-authentication Start message, the MME 102 sends an Authentication Data Request message to the HSS 105 to request for the EPS authentication of the mobile terminal (305), and the HSS 105 sends an Authentication Data Response message containing the EPS authentication information of the mobile terminal 100 to the MME 102 (306). If the Authentication Data Response message is received, the MME 102 sends an L3 Pre-authentication Request message containing the EPS-AKA User Authentication Request to the mobile terminal 100. Upon receipt of the L3 Pre-authentication Response message, the mobile terminal 100 verifies the Authentication challenge (RAND) and Authentication token (AUTN) contained in the Authentication Data Response message and sends an L3 Pre-authentication Response message containing the EPS-AKA USER Authentication Response to the MME 102 (308). Both the mobile terminal 100 and the MME 1-2 generate and store a $K_{ASME}$SA and a $K_{ASME}$ ID, respectively (309).

Next, the mobile terminal 100 sends an Attach Request message to the eNB 101 of the target LTE/SAE network to attempt the handover to the LTE/SAE network (310). The Attach Request message contains the $K_{SAME}$ID generated in the pre-authentication process. Upon receipt of the Attach Request message, the eNB 101 forwards the Attach Request message to the MME 104 (311), and the MME 104 received the Attach Request message searches the cache for a matched $K_{ASME}$ID. If the matched $K_{ASME}$ID is found in the $K_{ASME}$SA cache, this means that the mobile terminal 100 is pre-authenticated, and thus the entire EPS-AKA authentication procedure is skipped.

Next, if the $K_{ASME}$ID is found, the MME 102 sends an NAS Security Mode Command message containing the $K_{ASME}$ID to the mobile terminal 100 to initiate the NAS SMC process (312). Upon receipt of the NAS Security Mode Complete message, the mobile terminal 100 sends a NAS Security Mode Complete message to the MME 102 (313) and starts a NAS operation. Also, the MME starts the NAS operation upon receipt of the NAS Security Mode Complete message is received from the mobile terminal. In order for the mobile terminal 100 to access the LTE/SAE network, there should be a predetermined message exchange between the MME 102 and a-GW 103 (the message exchange between the MME and a-GW is specified in the 3GPP 33.401, and detailed description thereon is omitted herein).

Next, the MME 102 sends an Attach Accept message containing an AS security context information of the mobile terminal 100 to the eNB 101 (314). Upon receipt of the Attach Accept message, the eNB 101 sends an AS Security Mode Command message to the mobile terminal 100 to execute the AS SMC process (315). Upon receipt of the AS Security Mode Command message, the mobile terminal 100 sends an AS Security Mode Complete message to the eNB 101 (316) and starts an RRC and UP operation. Also, the eNB 101 starts the RRC and UP operations upon receipt of the AS Security Mode Complete message. After predetermined message exchanges among the mobile terminal, eNB, MME, and a-GW, the eNB 101 sends an Attach Complete message to the MME 102 (317), and as a consequence, the handover procedure is completed.

Figure 4:
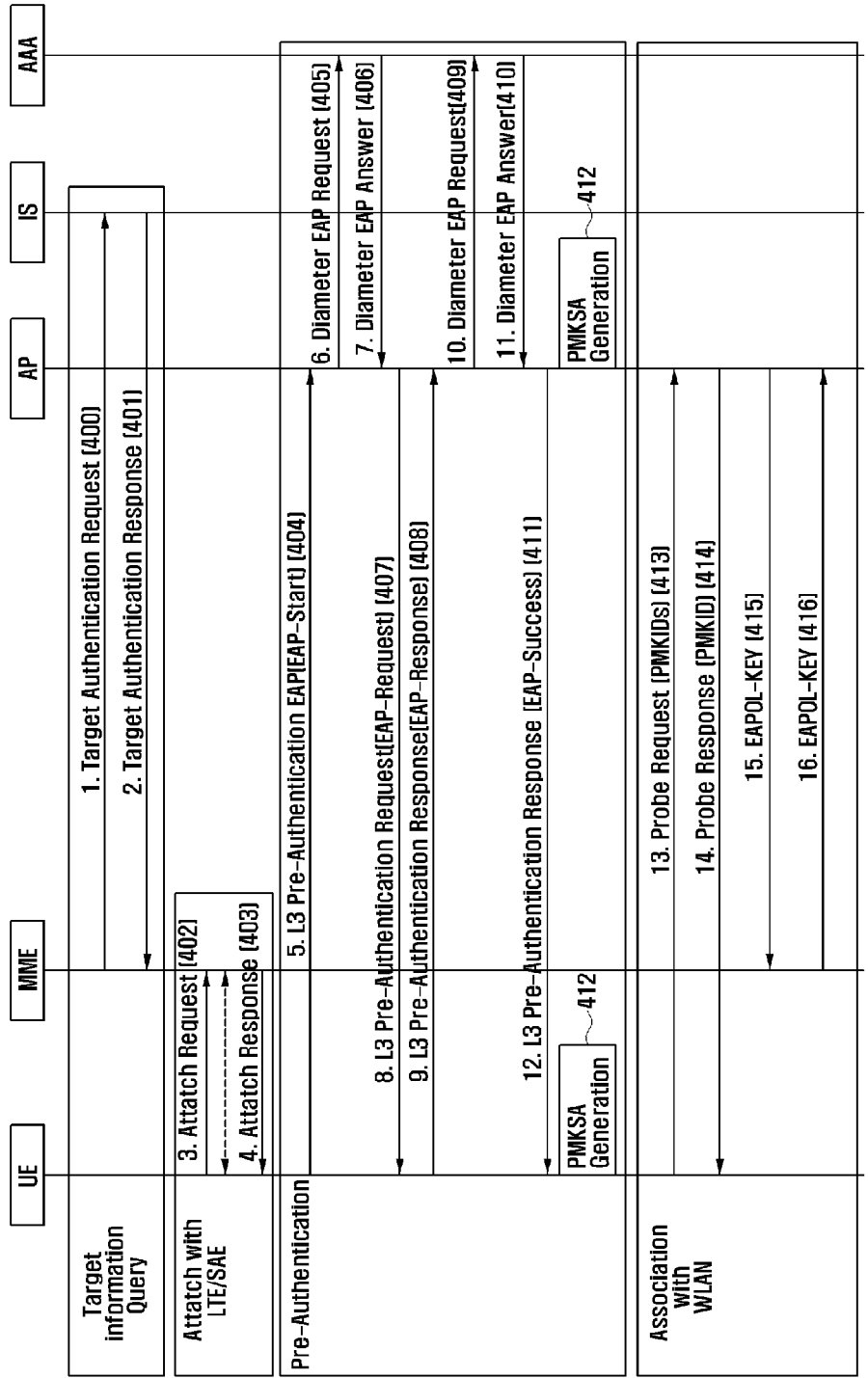
FIG. 4 is a sequence diagram illustrating operations of network entities in a handover of a mobile terminal between heterogeneous networks according to another exemplary embodiment of the present invention.

FIG. 4 is a sequence diagram illustrating operations of network entities in a handover of a mobile terminal between heterogeneous networks according to another exemplary embodiment of the present invention. In the exemplary embodiment of FIG. 4, the mobile terminal 100 attempts the handover from the LTE/SAE network to the WLAN network.

Referring to FIG. 4, the handover method from the LTE/SAE network to the WLAN network is divided into four processes. The first process is a target information query process in which the mobile terminal acquires the information on the available APs from the IS 107 at the system setup of the LTE/SAE network. This process is a process for preparing the pre-authentication. The second process is an LTE/SAE association process in which the mobile terminal 100 connects to the LTE/SAE network. Third process is a pre-authentication process in which the mobile terminal 100 is actually performing the pre-authentication with the AP 104 of the WLAN network. Finally, the fourth process is a WLAN attachment process in which the mobile terminal 100 attempts the handover to attach to the WLAN network. In the WLAN attachment process, the PMKSA is used such that the entire IEEE 802.11i authentication step is negated. The stepwise processes for the handover are described hereinafter in more detail.

First, the MME 102 of the LTE/SAE network as the source network sends a Target Authentication Request message to the IS 107 at the system setup of the LTE/SAE network. Upon receipt of the Target Authentication Request message, the IS 107 sends a Target Authentication Response message containing the IP addresses of available authentication entities of the potential target networks to the MME 102 (401).

Afterward, the mobile terminal 100 sends an Attach Request message to the MME 102 to attempt the access to the LTE/SAE network (402), and the MME 102 sends an Attach Response message to the mobile terminal 100 after a predetermined message exchange (the message exchange between the MME and a-GW is specified in the 3GPP 33.401, and detailed description thereon is omitted herein) to permit the access of the mobile terminal 100 in response to the Attach Request message (403). The Attach Response message contains the IP addresses of the available authentication entities of the potential target networks.

Once the Attach Response message is received, the mobile terminal 100 sends an L3 Pre-authentication EAP message to the AP 104 as the authentication entity of the target WLAN network to initiate the pre-authentication procedure (404). Since steps 404 to 411 correspond to the pre-authentication process specified in the IEEE 802.1x standards, detailed description thereon is omitted. Once the pre-authentication is successfully completed through steps 404 to 411, the PMKSA and PMKID are created at both the mobile terminal 100 and the AP 104 (412).

Next, the mobile terminal 100 sends a Probe Request message to the AP 104 to attempt the handover to the LTE/SAE network (413). The Probe Request message contains the PMKID created at the pre-authentication process. Upon receipt of the Probe Request message, the AP 104 searches the PMKSA cache for a matched PMKID. If the matched PMKID is found, this means that the mobile terminal 100 is pre-authenticated, and thus the entire EAP authentication procedure is skipped. In this case, the AP 104 sends a Probe Response message containing the matched PMKID) to the mobile terminal 100 in response to the Probe Request message (414). Next, the mobile terminal 100 and the AP 104 perform a Key handshake process of the IEEE 802.11i standard to exchange the EAPOL-KEY (415 and 416), and thus the handover completes.

FIG. 5 is a diagram illustrating the principle of how to reduce the handover delay in the handover method using the pre-authentication process according to an exemplary embodiment of the present invention.

As shown in FIG. 5, in case that the pre-authentication process is not adopted to the handover between the heterogeneous networks, the handover delay is the sum of the L2 association process duration 503 beginning at the handover start time 501 and the access authentication time duration 504, whereby the IP connection is enabled at the time point 502 when the access authentication process is completed, resulting in relatively long handover latency.

In case that the pre-authentication process is adopted to the handover between the heterogeneous networks, however, since the access authentication process 506 has been completed already before the handover start time 501, the handover delay is equal to the L2 association time and the IP connection is enabled at the time point 505 when the L2 association is completed, reduction of handover delay.

INDUSTRIAL APPLICABILITY

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A handover method for a mobile terminal between heterogeneous networks, comprising:

receiving, by the mobile terminal and via a source network, a packet from a device of the source network, a payload of the packet including information on at least one target authenticator of at least one target network from a source authenticator of the source network, the information including a respective Internet Protocol (IP) address of the at least one target authenticator of the at least one target network which is selectable by the mobile terminal for performing a handover;

transmitting, by the mobile terminal and via the source network, a pre-authentication start request message to a target authenticator selected, by the mobile terminal, from among at least one target authenticators of target networks which are selectable by the mobile terminal for performing a handover using the IP address of the target authenticator;

receiving, by the mobile terminal and via the source network, a user authentication start request message from the target authenticator in response to receiving the pre-authentication start request message transmitted by the mobile terminal;

transmitting, by the mobile terminal and via the source network, a user authentication response message to the target authenticator in response to the user authentication start request message and generating an authentication key that is used for communication between the mobile terminal and the target authenticator; and transmitting, by the mobile terminal and via a target network, an attach request message for attaching the mobile terminal to the target network, the attach request message including the generated authentication key.

2. The handover method of claim 1, wherein the source network and the target network are heterogeneous.

3. The handover method of claim 1, wherein the source network is a Long Term Evolution (LTE) network and the target network is different from a LTE network.

4. The handover method of claim 3, wherein the source authenticator is a Mobility Management Entity (MME).

5. The handover method of claim 4, wherein the target authenticator is an Access Point (AP).

6. The handover method of claim 5, wherein the authentication key is a Pairwise Master Key Security Authentication (PMKSA).

7. The handover method of claim 1, wherein the source network is different from a Long Term Evolution (LTE) network and the target network is a LTE network.

8. The handover method of claim 7, wherein the target authenticator is a Mobility Management Entity (MME).

9. The handover method of claim 8, wherein the source authenticator is an Access Point (AP).

10. The handover method of claim 8, wherein the authentication key is the first 128 bits of a result of a Hash Message Authentication Code (HMAC)-Secure Hash Algorithm 1 (SHA1) operation, which is denoted as a HMAC-SHA1-128 operation, wherein the HMAC-SHA1-128 operation is performed using an Authentication Key and by concatenating an Authentication Key Identifier corresponding to the Authentication Key and a unique terminal identifier, and
wherein the first 128 bits of the result of the HMAC-SHA1-128 operation start with a least significant bit of a least significant word of the result HMAC-SHA1-128 operation.

11. A mobile terminal, comprising:
a receiver configured to receive, via a source network, a packet from a device of the source network, a payload of the packet including information on at least one target authenticator of at least one target network from a source authenticator of the source network, the information including a respective Internet Protocol (IP) address of the at least one target authenticator of the at least one target network which is selectable by the mobile terminal for performing a handover;
a controller configured to control to transmit, via the source network, a pre-authentication start request message to a target authenticator selected, by the mobile terminal, from among at least one target authenticators of target networks which are selectable by the mobile terminal for performing a handover using the IP address of the target authenticator and to receive, via the source network, a user authentication start request message from the target authenticator in response to receiving the pre-authentication start request message transmitted by the mobile terminal; and
a transmitter configured to transmit, via the source network, a user authentication response message to the target authenticator in response to the user authentication start request message,
wherein the controller generates an authentication key that is used for communication between the mobile terminal and the target authenticator and controls to transmit, via a target network, an attach request message for attaching the mobile terminal to the target network, the attach request message including the generated authentication key.

12. The mobile terminal of claim 11, wherein the source network and the target network are heterogeneous.

13. The mobile terminal of claim 11, wherein the source network is a Long Term Evolution (LTE) network and the target network is different from a LTE network.

14. The mobile terminal of claim 13, wherein the source authenticator is a Mobility Management Entity (MME).

15. The mobile terminal of claim 14, wherein the target authenticator is an Access Point (AP).

16. The mobile terminal of claim 15, wherein the authentication key is a Pairwise Master Key Security Authentication (PMKSA).

17. The mobile terminal of claim 11, wherein the source network is different from a Long Term Evolution (LTE) network and the target network is a LTE network.

18. The mobile terminal of claim 17, wherein the target authenticator is a Mobility Management Entity (MME).

19. The mobile terminal of claim 18, wherein the source authenticator is an Access Point (AP).

20. The mobile terminal of claim 18, wherein the authentication key is the first 128 bits of a result of the Hash Message Authentication Code (HMAC)-Secure Hash Algorithm 1 (SHA1) operation, which is denoted as a HMAC-SHA1-128 operation, wherein the HMAC-SHA1-128 operation is performed using an Authentication Key and by concatenating an Authentication Key Identifier corresponding to the Authentication Key and a unique terminal identifier, and
wherein the first 128 bits of the result of the HMAC-SHA1-128 operation start with a least significant bit of a least significant word of the result HMAC-SHA1-128 operation.

21. A handover method for an authenticator handing-over a mobile terminal between heterogeneous networks, comprising:
receiving, by the authenticator and from the mobile terminal, a packet having a payload including information on at least one target authenticator of at least one target network from a server, the received information including a respective Internet Protocol (IP) addresses of the at least one target authenticator of the at least one target network which is selectable by the mobile terminal for performing a handover;
transmitting, by the authenticator and via a source network in which the authenticator processes authentication of a mobile terminal, the received information on the at least one target authenticator of the at least one target network to a mobile terminal; and
wherein the transmitted information is received by the mobile terminal and used to transmit, via the source network, a pre-authentication start request message to a target authenticator selected, by the mobile terminal, from among the at least one target authenticator of the at least one target network.

22. The handover method of claim 21, wherein the source network and the target network are heterogeneous.

23. The handover method of claim 21, wherein the source network is a Long Term Evolution (LTE) network and the at least one target network is different from a LTE network.

24. The handover method of claim 23, wherein the authenticator is a Mobility Management Entity (MME).

25. The handover method of claim 24, wherein the target authenticator is an Access Point (AP).

26. The handover method of claim 21, wherein the source network is different from a Long Term Evolution (LTE) network and the at least one target network is a LTE network.

27. The handover method of claim 26, wherein the target authenticator is a Mobility Management Entity (MME).

28. The handover method of claim 27, wherein the authenticator is an Access Point (AP).

29. A handover method for an authenticator between heterogeneous networks, comprising:
  receiving, by the authenticator, a pre-authentication start request message from a mobile terminal, the pre-authentication start request message being received via a source network in which a source authenticator processes authentication of a mobile terminal, the source authenticator being different than the authenticator;
  transmitting, by the authenticator and via the source network, a user authentication start request message to the mobile terminal in response to the pre-authentication start request message;
  receiving, by the authenticator, a user authentication response message from the mobile terminal in response to the user authentication start request message and generating a first authentication key that is used for communication between the mobile terminal and the authenticator, the user authentication response message being transmitted via the source network;
  receiving, by the authenticator and via a target network, an attach request message for attaching the mobile terminal to the target network, the attach request message including a second authentication key; and
  determining, by the authenticator, whether the second authentication key included in the attach request message matches with the first authentication key,
  wherein the pre-authentication start request message includes an Internet Protocol (IP) address of the authenticator received via the source network.

30. The handover method of claim 29, wherein the source network and the target network are heterogeneous.

31. The handover method of claim 29, wherein the source network is a Long Term Evolution (LTE) network and the target network is different from a LTE network.

32. The handover method of claim 31, wherein the source authenticator is a Mobility Management Entity (MME).

33. The handover method of claim 31, wherein the authenticator is an Access Point (AP).

34. The handover method of claim 29, wherein the source network is different from a Long Term Evolution (LTE) network and the target network is a LTE network.

35. The handover method of claim 34, wherein the authenticator is a Mobility Management Entity (MME).

36. The handover method of claim 34, wherein the source authenticator is an Access Point (AP).

37. An authenticator for processing authentication of a mobile terminal, comprising:
  a receiver configured to receive a packet from the mobile terminal, a payload of the packet including information on at least one target authenticator of at least one target network from a server, the received information including a respective Internet Protocol (IP) address of the at least one target authenticator of the at least one target network which is selectable by the mobile terminal for performing a handover; and
  a transmitter configured to transmit, via a source network in which the authenticator processes authentication of the mobile terminal, the received information on the at least one target authenticator of the at least one target network to the mobile terminal,
  wherein the transmitted information is used to transmit, via the source network, a pre-authentication start request message to a target authenticator by the mobile terminal.

38. An authenticator for processing authentication of a mobile terminal, comprising:
  a receiver configured to receive a pre-authentication start request message from the mobile terminal, the pre-authentication start request message being received via a source network in which a source authenticator processes authentication of a mobile terminal, the source authenticator being different than the authenticator;
  a transmitter configured to transmit, via the source network, a user authentication start request message to the mobile terminal in response to the pre-authentication start request message; and
  a controller configured to control to receive a user authentication response message from the mobile terminal in response to the user authentication start request message, generate a first authentication key that is used for communication between the mobile terminal and the authenticator, the user authentication response message being transmitted via the source network, and determine whether a second authentication key included in an attach request message matches with the first authentication key upon receiving, via a target network, the attach request message for attaching the mobile terminal to the target network,
  wherein the pre-authentication start request message includes an Internet Protocol (IP) address of the authenticator received via the source network.

* * * * *